Oct. 30, 1956   K. NICOL ET AL   2,768,584
PUMP-MOTOR COMBINATIONS
Filed Jan. 4, 1954   3 Sheets-Sheet 1
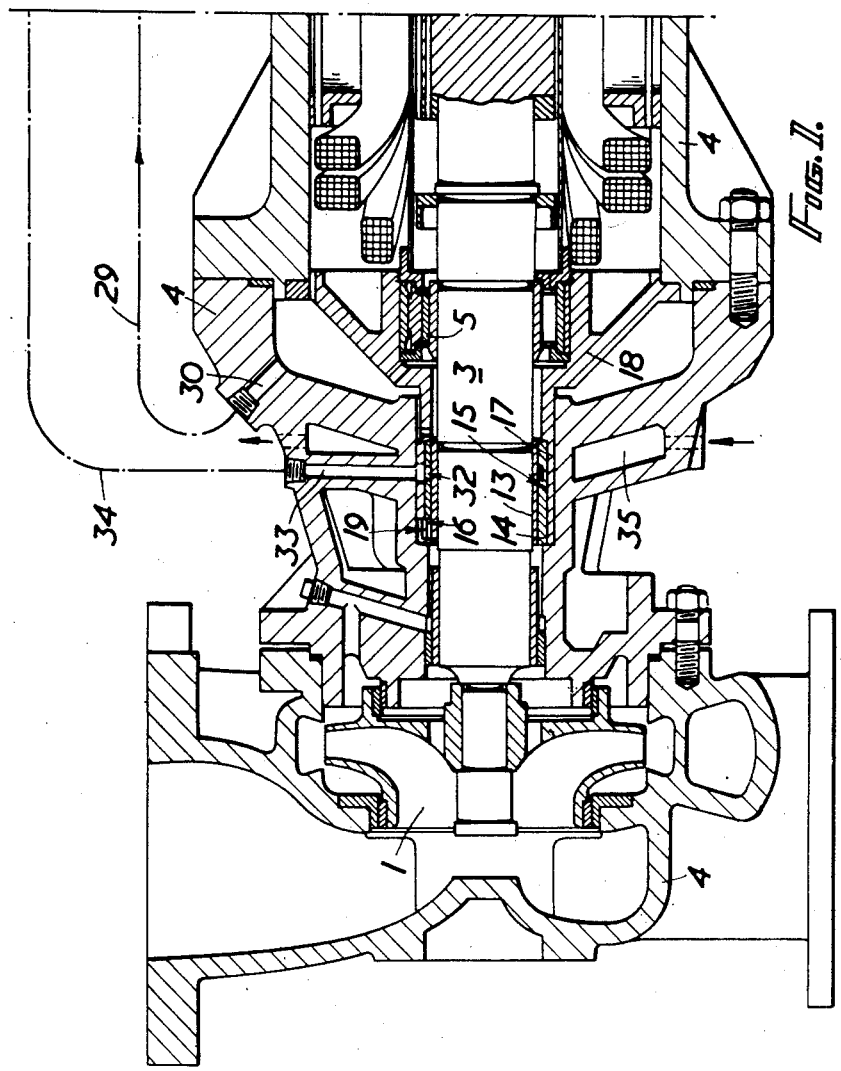
Fig. II.
INVENTORS
NICOL ET AL
BY J. M. Ergas
AGENT OR ATTORNEY

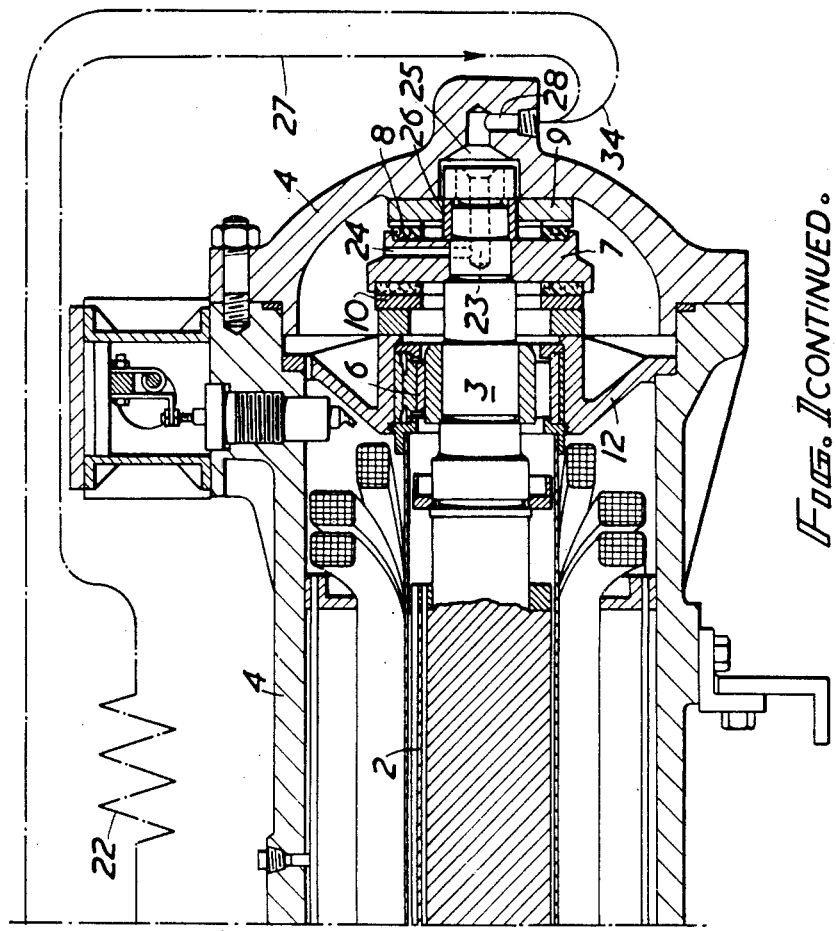
FIG. I CONTINUED.

United States Patent Office 2,768,584
Patented Oct. 30, 1956

2,768,584

PUMP-MOTOR COMBINATIONS

Kenneth Nicol and John Codrington Mansfield, Luton, England, assignors to Hayward-Tyler & Company Limited, Luton, England Application January 4, 1954, Serial No. 401,917

Claims priority, application Great Britain January 2, 1953

4 Claims. (Cl. 103—87)

This invention relates to pump-motor combinations. The object of the invention is the provision of improvements in such combinations. The invention consists broadly of a pump and motor combination of the kind in which the pump and motor are mounted on a common shaft and are enclosed in what is essentially a common casing, wherein the sole way of liquid communication from the pump to the motor is by way of a flameproof gap between a surface which rotates with the shaft and a surface which is stationary with the common casing.

In order that the invention may be the more clearly understood a pump-motor combination in accordance therewith will now be described, reference being made to the accompanying drawings wherein:

Figure 1 is a longitudinal section of said pump-motor combination;

Figure 2:
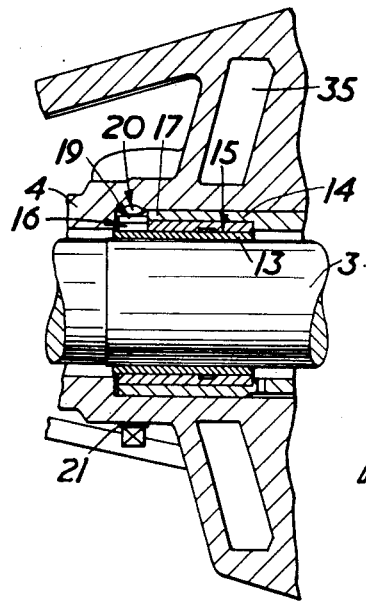
Figure 2 is a longitudinal section, to a larger scale, of a portion of said pump-motor combination, taken in a slightly different plane from that of Figure 1.
Figure 3:
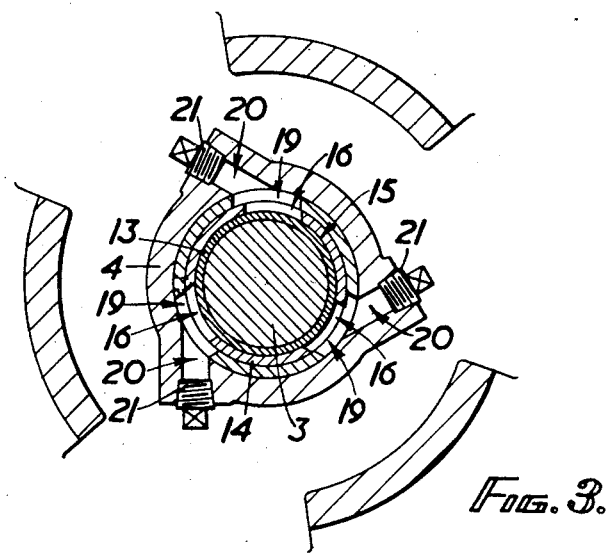
Figure 3 is a cross section on line III—III of Figure 2.

Referring to the drawings the pump-motor combination therein illustrated is of the same general kind as that known in the art. That is to say, it is of the kind in which the pump 1 and motor 2 are mounted on a common shaft 3 which is enclosed in what is essentially a common casing 4, so that the liquid being pumped has access to the part of said common casing which houses the motor. Thus the motor 2 runs immersed in liquid which is of the same pressure as the liquid being pumped, and the shaft 3 requires no gland which supports a pressure difference between its ends. A pump-motor combination of this kind is especially useful when the liquid being pumped is of high pressure independently of the operation of the pump.

The pump-motor combination according to the present arrangement is also especially useful when the liquid being pumped is inflammable, as for example when it is a liquid petroleum product.

In the present arrangement said common shaft 3 runs in two journal bearings 5 and 6 which are located just beyond the two ends of the motor 2. These journal bearings are of the tilting pad type. Beyond the one (6) of the two journal bearings which is remote from the pump, said shaft has mounted on it a massive bearing disc 7. One end-thrust bearing 8 is provided between the remote face of said bearing disc and a massive fixed plate 9 bolted to the end of the common casing 4, and another end-thrust bearing 10 is provided between the near face of said bearing disc 7 and a bearing ring 11 secured to the housing 12 of said journal bearing 6. These end-thrust bearings 8 and 10 are also of the tilting pad type.

Between the journal bearing 5 and the pump 1, the shaft 3 has mounted fast thereon a sleeve 13 of non-sparking material and this sleeve is surrounded by an outer sleeve 14, also of non-sparking material, carried by the common casing 4. The clearance 15 between the two sleeves 13 and 14 is very small, and constitutes what is known as a flame-proof gap, that is a gap such that any ignition of the liquid on the pump side of said gap cannot pass therethrough to the motor side. This flame-proof gap forms from the sole way of liquid communication between the pump and the motor.

In order that it may be possible from time to time to measure the width of the flame-proof gap 15, the outer sleeve 14 of non-sparking material has, say three equally spaced rectangular "bites" 16 cut out of its end nearest the pump. Immediately surrounding this outer sleeve is a metal sleeve 17 constituted by a tail-end projection of the housing 18 of the journal bearing 5, and this metal sleeve 17 also has three rectangular bites 19 cut out of its end nearest the pump, which bites 19 register with those 16 of the outer non-sparking sleeve 14. The casing 4 surrounding said metal sleeve 17 has three corresponding holes 20 through it which are inclined so that their centre lines are tangential with respect to the flame-proof gap 15. These three holes 20, whose outer ends are normally closed by screw plugs 21, register respectively with the three pairs of rectangular bites 16, 19, so that, by removing the screw plugs 21, a long feeler can be passed through each of the three holes 20 and tangentially into the flame-proof gap 15, so that the width of the latter can be measured at each of three equally spaced angular positions therearound.

As in the prior specifications aforesaid, the liquid in the portion of the common casing 4 which houses the motor is circulated through an external cooling device 22. This circulation is effected by means of a small impeller, which is constituted by drilling an axial hole 23 in the end of the shaft 3 remote from the pump 1, and drilling a number of radial holes 24 into the circumferential periphery of the aforesaid bearing disc, which radial holes pass through said bearing disc into the shaft 3 and join said axial hole 23. Said shaft 3 passes through a hole in the aforesaid massive fixed plate 9, and its end lies within a recess 25 in the thickness of the end wall of the casing 4 beyond said massive fixed plate 9. Said shaft has a sleeve 26 on it which fits freely but closely in said hole in said massive fixed plate 9 so that liquid cannot flow easily from one side of said plate to the other.

The outlet of the external cooling device 22 is connected by a pipe 27 to the outer end of a hole 28 in the end wall of the casing whose inner end opens into said recess 25. The inlet of said cooling device 22 is connected by a pipe 29 to the outer end of a hole 30 through the wall 4 of the casing which hole opens into the casing at a region between the journal bearing 5 and the flame-proof gap 15.

As the bearing disc 7 rotates, the liquid will flow by centrifugal force outwardly through the radial holes 24, and consequently liquid will flow from the outlet of the cooling device, into the recess 25 in the end wall of the casing, along said axial bore hole 23 out through said radial holes 24, along the casing, and out through the hole 30 in the wall of the casing to the inlet of the cooling device 22. The cooled liquid flowing along the casing from the radial holes 24 in the bearing disc 7 to said hole 30 in the wall of the casing flows through the stator windings 31, through longitudinal holes in the stator pack, and also through the gap between the stator and the rotor. It also flows through both of the tilting pad journal bearings 6 and 5.

A further feature of the invention is that the pressure at 28 on the inlet side of the small impeller is maintained the same as the pump delivery pressure, so that the pressure throughout the casing up to the flame-proof gap 15 is somewhat higher than the pump delivery pressure. This reduces the likelihood of "cavitation" within the liquid in the casing. It is effected by providing a liquid communication between the flame-proof gap (near the motor end thereof) and the hole 28. To this end an annular recess 32 is provided in the inner periphery of the outer (14) of the sleeves of non-sparking material, and a hole 33 passes from said recess through said sleeve 14, the metal sleeve 17 and the wall 4 of the casing and joins an external pipe 34 which in turn joins the pipe 27 which extends between the outlet of the external cooling device and the recess in the thickness of the end wall, the junction being near to said hole 28.

Between the motor portion and the pump portion of the common casing 4, there is a reduced neck, and the flame-proof gap 15 is located in this reduced neck. In the thickness of the wall 4 just on the motor side of this neck an annular cavity 35 is provided, and cooling water, say from the water mains, is made to flow through this cavity. Said cavity circumscribes the flame-proof gap 15 or at least a part thereof.

Air venting means may be provided. This in the present instance would be used for venting gas if any should form in the liquid.

We claim:

1. In a liquid pumping system having a pump and motor combination mounted on a common shaft and enclosed in a common casing, flame proofing means for defining a flame proof gap between said shaft and said casing, said flame proofing means including an inner sleeve member mounted on said shaft, an outer sleeve member surrounding said inner sleeve member and defining a clearance therewith constituting said flame proof gap, said outer sleeve member being provided with at least one circumferential cut out at the end thereof adjacent the pump end of said pump and motor combination and being carried by said casing, said casing being provided with at least one passage adapted to be closed, said passage being tangentially directed with respect to the periphery of said outer sleeve member and communicating with said circumferential cut out, whereby when said passage is opened measurement may be taken of the dimension of said flame proof gap.

2. In a liquid pumping system constructed according to claim 1, liquid circulating means provided in said casing and along said flame proof gap.

3. In a liquid pumping system constructed according to claim 2, said liquid circulating means comprising impeller means at the motor end of said pump and motor combination, whereby upon rotation of said shaft liquid is centrifugally circulated to thereby keep the pressure throughout said casing and up to said flame proof gap higher than the pressure at the liquid delivery end of said pump and motor combination.

4. In a liquid pumping system constructed according to claim 1, said casing being provided with an annular central neck portion between the ends thereof, said flame proofing means being positioned in said neck portion, and an annular cavity being provided in said casing and around said annular central neck portion, said annular cavity being adapted to be connected to a source of cooling fluid and circulating the latter around said annular central neck portion.

References Cited in the file of this patent
UNITED STATES PATENTS

| | | |
|---|---|---|
| 2,120,914 | Vogel | June 14, 1938 |
| 2,598,547 | Ivanoff | May 27, 1952 |